(12) United States Patent
Bellary et al.

(10) Patent No.: US 10,614,426 B2
(45) Date of Patent: Apr. 7, 2020

(54) SMARTER EVENT PLANNING USING COGNITIVE LEARNING

(71) Applicant: International Business Machines Corporation, Armonk, NY (US)

(72) Inventors: Shashank Bellary, Littleton, MA (US); Mohamad El-Rifai, Boylston, MA (US); Andrew Jang, Littleton, MA (US); Peter E. Stubbs, Georgetown, MA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 15/822,262

(22) Filed: Nov. 27, 2017

(65) Prior Publication Data

US 2019/0164135 A1    May 30, 2019

(51) Int. Cl.
  *G06Q 10/10*  (2012.01)
  *G06F 17/27*  (2006.01)
  *G06Q 50/00*  (2012.01)
(52) U.S. Cl.
  CPC ..... *G06Q 10/1095* (2013.01); *G06F 17/2785* (2013.01); *G06Q 50/01* (2013.01)
(58) Field of Classification Search
  CPC ............................... G06Q 10/00; G06Q 50/00
  USPC ................................................. 705/7.11–7.42
  See application file for complete search history.

(56) References Cited

U.S. PATENT DOCUMENTS

| | | | |
|---|---|---|---|
| 5,781,731 A * | 7/1998 | Koreeda | H04M 3/56 709/204 |
| 5,842,182 A | 11/1998 | Bonner et al. | |
| 8,121,953 B1 * | 2/2012 | Orttung | G06Q 10/1095 705/35 |
| 8,949,330 B2 * | 2/2015 | Chennamadhavuni | G06Q 30/0269 705/14.53 |
| 9,118,724 B1 | 8/2015 | Sooriyan et al. | |
| 9,141,942 B2 | 9/2015 | Malkin et al. | |
| 9,202,233 B1 * | 12/2015 | Siegel | G06Q 30/0252 |
| 9,424,533 B1 | 8/2016 | Zadeh | |
| 9,687,187 B2 | 6/2017 | Dagum | |

(Continued)

OTHER PUBLICATIONS

"Multi-Criteria Approach to Planning and Scheduling Through Criticism and Repair", IP.Com Prior Art Technical Database Disclosure No. IPCOM000233777D, Dec. 19, 2013. 7 pages.

(Continued)

*Primary Examiner* — Alan S Miller
(74) *Attorney, Agent, or Firm* — Yee & Associates, P.C.

(57) ABSTRACT

Selecting an optimal date for a planned event is provided. Event input data is received that includes at least one of a location for a planned event, a range of dates for the planned event, attributes of a target audience for the planned event, and attributes of the planned event. Web search data and social media data corresponding to the received event input data are retrieved. The received event input data and the retrieved web search data and social media data that correspond to the received event input data are analyzed using natural language processing to identify a set of optimal dates to maximize attendance of the target audience at the planned event. The identified set of optimal dates for the planned event is ranked based on weights assigned to each of the attributes of the target audience and the attributes of the planned event.

20 Claims, 4 Drawing Sheets

(56) References Cited

U.S. PATENT DOCUMENTS

| | | | | |
|---|---|---|---|---|
| 2002/0184063 | A1* | 12/2002 | Kaufman | G06Q 10/0631 705/7.12 |
| 2003/0004773 | A1* | 1/2003 | Clark | G06O 10/109 705/7.19 |
| 2003/0191772 | A1* | 10/2003 | Schaumann | G06Q 10/109 |
| 2007/0118415 | A1* | 5/2007 | Chen | G06Q 10/02 705/5 |
| 2007/0143168 | A1* | 6/2007 | Plas | G06Q 10/063116 705/7.16 |
| 2008/0133282 | A1* | 6/2008 | Landar | G06Q 10/02 705/5 |
| 2008/0300937 | A1* | 12/2008 | Allen | G06Q 10/109 705/7.33 |
| 2009/0055235 | A1* | 2/2009 | Oral | G06Q 10/06314 705/7.24 |
| 2009/0265203 | A1* | 10/2009 | Marcus | G06Q 10/109 705/7.18 |
| 2009/0319319 | A1* | 12/2009 | Oral | G06Q 10/109 705/7.18 |
| 2011/0320237 | A1* | 12/2011 | Beaman | G06Q 10/06314 705/7.24 |
| 2013/0024431 | A1* | 1/2013 | Parthasarathy | G06F 16/3334 707/692 |
| 2013/0246526 | A1* | 9/2013 | Wu | G06Q 10/109 709/204 |
| 2014/0172483 | A1* | 6/2014 | Bellers | G06Q 10/1095 705/7.16 |
| 2015/0088872 | A1* | 3/2015 | Sankar | G06Q 50/01 707/723 |
| 2015/0248651 | A1* | 9/2015 | Akutagawa | G06Q 10/1095 705/7.19 |
| 2016/0267404 | A1* | 9/2016 | Shicoff | G06Q 10/025 |
| 2016/0324457 | A1 | 11/2016 | Dagum | |
| 2017/0178034 | A1* | 6/2017 | Skeen | G06F 16/168 |
| 2017/0236097 | A1* | 8/2017 | Smith | G06Q 10/1095 705/7.19 |
| 2018/0025373 | A1* | 1/2018 | Perriman | G06Q 30/0205 |
| 2018/0046957 | A1* | 2/2018 | Yaari | G06N 5/022 |
| 2019/0036866 | A1* | 1/2019 | Iseminger | G06F 17/248 |

OTHER PUBLICATIONS

"A Method and System for Cognitively Planning Mobile Events", IP.Com Prior Art Technical Database Disclosure No. IPCOM000249004D, Jan. 25, 2017, 3 pages.

"System and method to cognitively organize meetings from multi-person chats", IP.Com Prior Art Technical Database Disclosure No. IPCOM000250469D, Jul. 24, 2017, 6 pages.

Liu et al., "Episodic Memory-Based Robotic Planning Under Uncertainty", IEEE Transactions on Industrial Electronics, vol. 64, No. 2, Feb. 2017, 11 pages.

Nussbaumer et al., "A Framework for Cognitive Bias Detection and Feedback in a Visual Analytics Environment", 2016 European Intelligence and Security Informatics Conference, Dec. 2016, 4 pages.

* cited by examiner

SMARTER EVENT PLANNING USING COGNITIVE LEARNING

BACKGROUND

1. Field

The disclosure relates generally to event planning and more specifically to selecting the best date and time for a planned event using cognitive learning to obtain a highest level of attendance for the planned event.

2. Description of the Related Art

Event management is the application of project management to plan large scale events. Event management involves studying the brand, identifying the target audience, devising the event concept, and coordinating the technical aspects before actually launching the event. The process of planning and coordinating the event is usually referred to as event planning and includes scheduling, site selection, and the like.

When scheduling a public or private event, such as, for example, a concert, a conference, a convention, a festival or fair, a charitable event, a sporting event, an educational event, a corporate event, an entertainment event, and the like, often it is difficult to find the best date and time to hold the event to maximize attendance. If the event does not get enough attendance, the organization hosting the event may lose potential profits or contributions and may even lose money altogether. As a result, many event scheduling challenges, such as, for example, what other events are already scheduled in the same area during the same time period, how many people who might be interested in the planned event are actually available to attend, and the like, need to be considered to have a successful event, but are not in the event planner's current knowledgebase.

SUMMARY

According to one illustrative embodiment, a computer-implemented method for selecting an optimal date for a planned event is provided. A data processing system receives event input data that includes at least one of a location for a planned event, a range of dates for the planned event, attributes of a target audience for the planned event, and attributes of the planned event. The data processing system retrieves web search data and social media data corresponding to the received event input data. The data processing system analyzes the received event input data and the retrieved web search data and social media data that correspond to the received event input data using natural language processing to identify a set of optimal dates to maximize attendance of the target audience at the planned event. The data processing system ranks the identified set of optimal dates for the planned event based on weights assigned to each of the attributes of the target audience and the attributes of the planned event. According to other illustrative embodiments, a data processing system and computer program product for selecting an optimal date for a planned event are provided.

DETAILED DESCRIPTION

Figure 1:
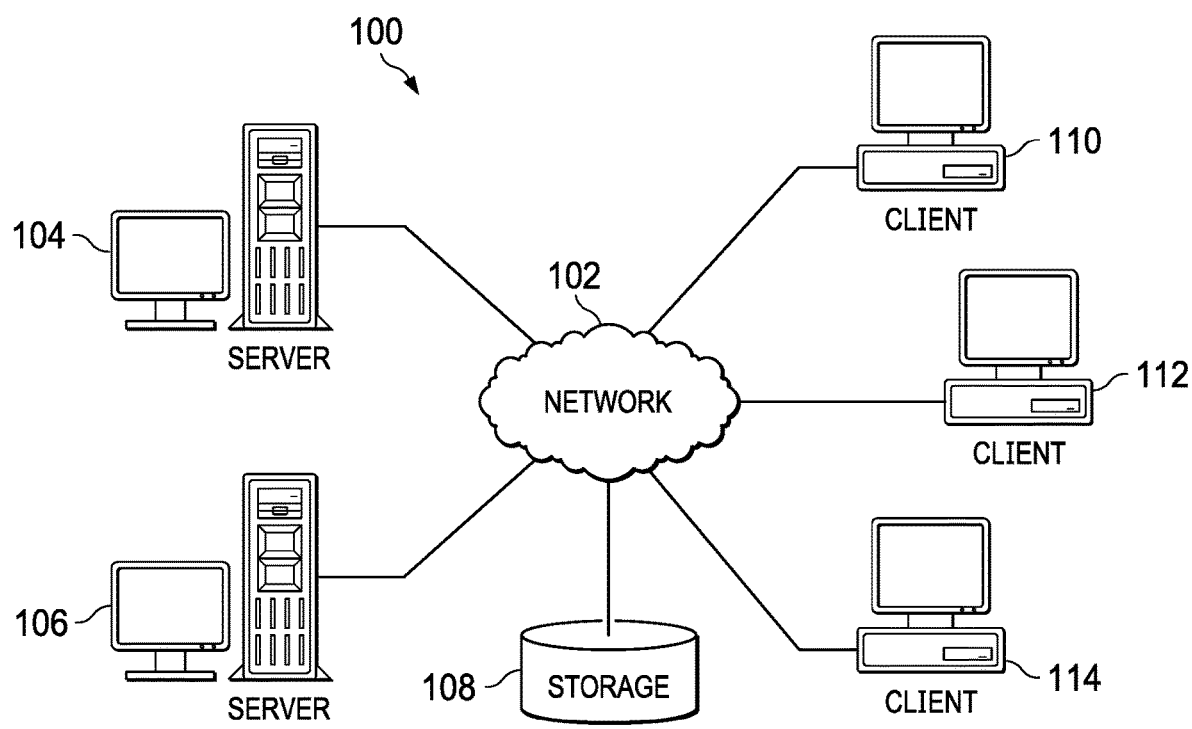
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
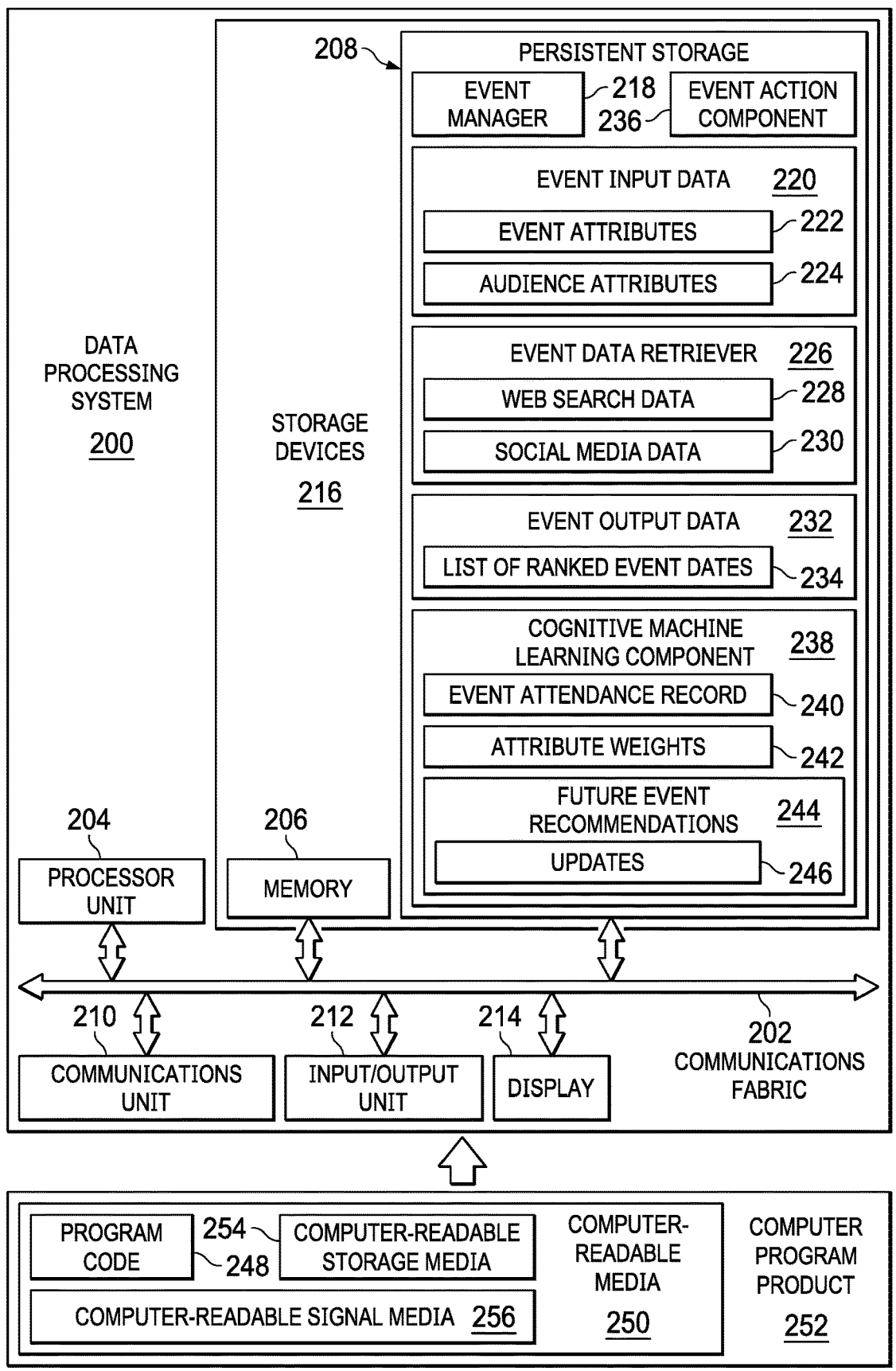
FIG. 2 is a diagram of a data processing system in which illustrative embodiments may be implemented.
Figure 3:
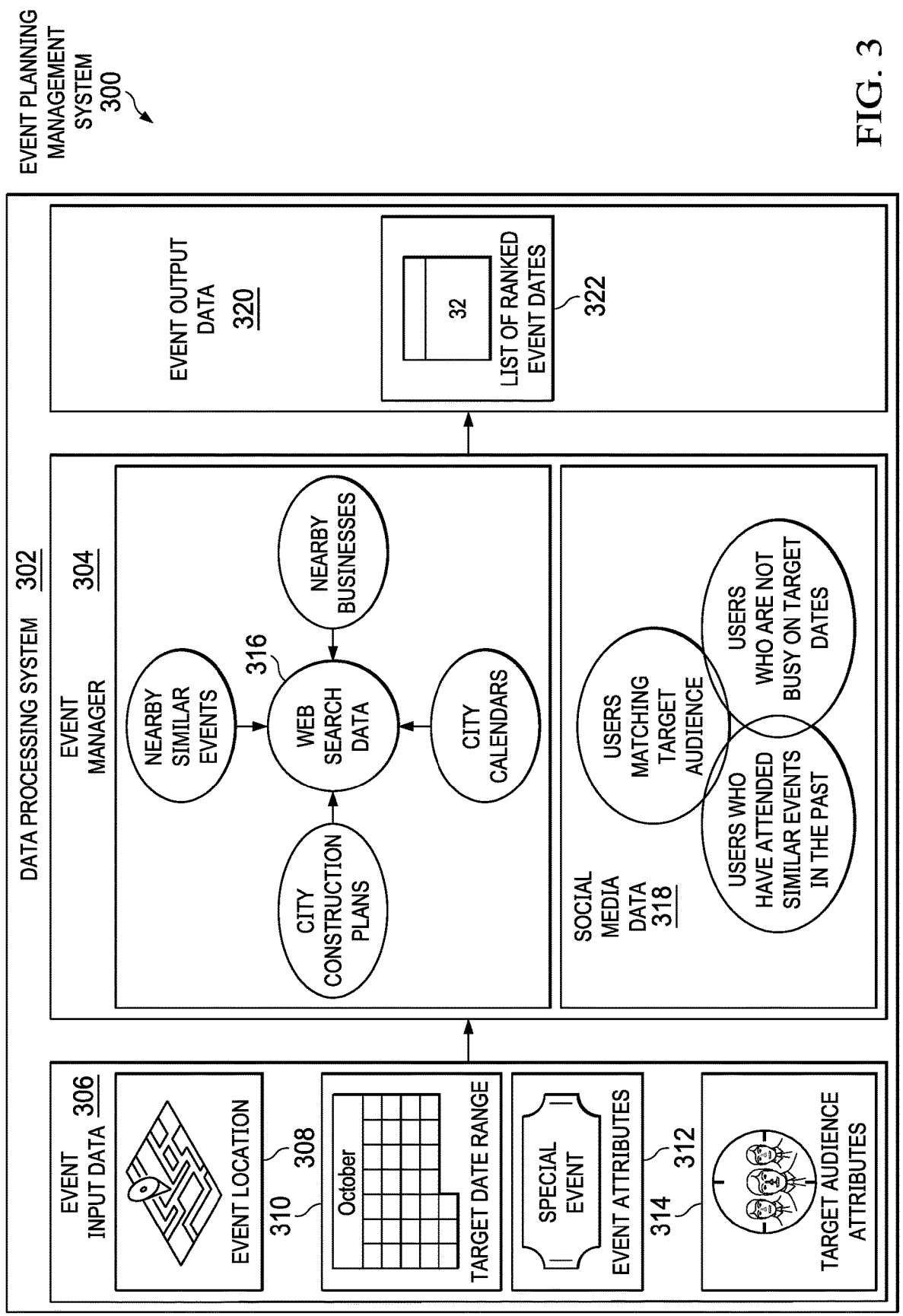
FIG. 3 is a diagram illustrating an example of an event planning management system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 may provide a set of services to client device users for selecting an optimal or best date and time for a planned event using cognitive learning to obtain maximum attendance for the planned event. Also, it should be noted that server 104 may represent a plurality of servers hosting a plurality of different event planning management services. Server 106 may be, for example, a social media website server providing social media services to client device users. In addition, it should be noted that server 106 may represent a plurality of different social media website servers hosting a plurality of different social media services.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, laptop computers, handheld computers, smart phones, smart televisions, smart watches, gaming devices, kiosks, and the like, with wire or wireless communication links to network 102. Users of clients 110, 112, and 114 may utilize clients 110, 112, and 114 to access the event planning management services provided by server 104 and the social media services provided by server 106.

Storage 108 is a network storage device capable of storing any type of data in a structured format or an unstructured format. In addition, storage 108 may represent a plurality of network storage devices. Further, storage 108 may store identifiers for a plurality of client device users; information, such as, for example, dates, times, locations, and attendance records, corresponding to a plurality of different past events; a plurality of different target audience attributes, web search data corresponding to the plurality of different past events; social media data corresponding to the plurality of different past events; and the like. Furthermore, storage unit 108 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as sever 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores event manager 218. However, it should be noted that even though event manager 218 is illustrated as residing in persistent storage 208, in an alternative illustrative embodiment event manager 218 may be a separate component of data processing system 200. For example, event manager 218 may be a hardware component coupled to communication fabric 202 or a combination of hardware and software components. In another alternative illustrative embodiment, a first set of components of event manager 218 may be located on data processing system 200, while a second set of components of event manager 218 may be located on a second data processing system, such as client 110 in FIG. 1. In yet another alternative illustrative embodiment, event manager 218 may be located on client devices in addition to or instead of data processing system 200.

Event manager 218 controls the process of selecting the optimal or best date and time for a planned event, such as, for example, a concert or conference, using cognitive learning to obtain a highest level of attendance for the planned event while decreasing the amount of expense and time spent on coordinating the planned event by a client device user, such as an event planner. Event manager 218 receives event input data 220 from the client device user. Event input data 220 represent different parameters, features, aspects, or characteristics corresponding to the planned event. In this example, event input data 220 include event attributes 222 and audience attributes 224. However, it should be noted that event input data 220 may include any type of event information.

Event attributes 222 represent characteristics of the planned event, itself, such as, for example, type of planned event, proposed location for the planned event, proposed dates for the planned event, cost of attending the planned event, and the like. Audience attributes 224 represent characteristics or traits, such as, for example, age range, personal interests and preferences, and likes and dislikes, corresponding to a target audience of the planned event.

Event manager 218 utilizes event data retriever 226 to crawl, for example, the Internet and other public and private networks, and retrieve information corresponding to event input data 220. In this example, event data retriever 226 retrieves web search data 228 and social media data 230. Web search data 228 represent information corresponding to event input data 220 collected by event data retriever 226 while performing a set of network searches. Web search data 228 may include, for example, information regarding same or similar events already scheduled in or near the proposed location for the planned event on or near the same proposed date for the planned event; information regarding businesses, entertainment, and places of interest near the planned event; information regarding proposed construction projects near the planned event; information regarding city events already scheduled on the same proposed date for the planned event; and the like. Social media data 230 represent information corresponding to event input data 220 collected by event data retriever 226 while searching a set of social media web sites. Social media data 230 may include, for example, information regarding social media users that have personal interests or preferences that match information in audience attributes 224; information regarding social media users that have previously attended events that are the same or similar to the planned event; information regarding social media users that are available (e.g., nothing scheduled in their posted electronic calendars) during the proposed date for the planned event; and the like.

After receiving event input data 220 and retrieving web search data 228 and social media data 230, event manager 218 analyzes all of the information to generate event output data 232. Event output data 232 includes list of ranked event dates 234. List of ranked event dates 234 represents a set of one or more dates selected by event manager 218 to maximize attendance of the planned event by the target audience. Event manager 218 ranks the set of one or more dates in the list in descending order from a highest ranking optimal date for the planned event to a lowest ranking optimal date. The highest ranking optimal date is the date that matches or meets the largest number of parameters and attributes corresponding to event input data 220, web search data 228, and social media data 230.

Event manager 218 selects the highest ranking optimal date for the planned event in list of ranked event dates 234 and utilizes event action component 236 to perform a set of actions corresponding to the planned event based on selection of the highest ranking optimal date. The set of actions may include, for example, scheduling the planned event on the selected highest ranking optimal date, reserving the site for the planned event, sending out event invitations to the target audience, and the like.

Event manager 218 utilizes cognitive machine learning component 238 to receive and analyze event attendance record 240. Event attendance record 240 represents the actual number of attendees at the planned event on the selected highest ranking optimal date. Cognitive machine learning component 238 compares event attendance record 240 with pervious event attendance records for same or similar events to improve date selection for future events. Further, cognitive machine learning component 238 compares attribute weights 242, which correspond to event attributes 222 and audience attributes 224, with event and audience attributes weights corresponding to the same or similar events previously held. By making these comparisons, cognitive machine learning component 238 can evaluate how successful the selected highest ranking optimal date was for the planned event. If cognitive machine learning component 238 determines that the selected highest ranking optimal date was not successful based on a defined threshold level of success, then cognitive machine learning component 238 may apply different weights to event attributes 222 and audience attributes 224 the next time the user runs event manager 218 to select the optimal or best date for a same or similar future planned event.

Furthermore, cognitive machine learning component 238 may generate future event recommendations 244 for recurring events, such as parades, festivals, and fairs, based on event attendance record 240 and attribute weights 242. Moreover, cognitive machine learning component 238 may generate updates 246 for future event recommendations 244 on a predetermined time interval basis, such as, a weekly, monthly, or quarterly basis, based on current web search data, social media data, weather prediction data, natural disaster data, airfare data, city labor data, and the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that scheduling an event, such as a concert, conference, charitable event, sporting event, educational event, corporate event, entertainment event, or the like, is very challenging because finding the best or optimal date and time to hold the event to maximize attendance consumes a lot of valuable time and resources. Illustrative embodiments retrieve and analyze unstructured data, such as, for example, web searches and social media content, and structured data, such as, for example, city calendars, business calendars, and previous event attendance records, to automatically select the best or optimal date and time in which to hold a planned event to maximize attendance by a target audience. An entity, such as a business or organization, that wants to host an event will want to maximize the profits or charitable contributions for that event. The amount of money received during that event is directly proportional to the number of attendees, which is directly related to date selection for the event.

First, illustrative embodiments receive information from a user, such as an event planner, as input in order for the illustrative embodiments to make the best possible event date and time selection. The input may include, for example, site or location for the planned event, a range of dates for the planned event, attributes corresponding to the planned event, and attributes corresponding to a target audience for the planned event. Attributes corresponding to the planned event may include, for example: type of event, such as concert, fund-raiser, parade, conference, et cetera; cost of attendance; one or more keywords describing the focus of the planned event, such as music, charity, technology, food, and/or entertainment; and the like. Attributes corresponding to the target audience may include, for example: age range of potential attendees; household income of potential attendees (e.g., ability to afford cost of attendance); geographic location of potential attendees (e.g., where potential attendees reside); personal interests or preferences of potential attendees that match keywords describing the focus of the planned event (e.g., if the planned event is a concert by a particular rock group, then check personal calendars for availability of potential attendees who are fans of that particular rock group during the proposed range of dates for the planned event); charitable giving practices of potential attendees if the planned event is a charitable fund-raiser event; and the like. However, it should be noted that illustrative embodiments may identify previous events that are the same or similar to the currently planned event and automatically input event information, which is editable by the user, to save the user time in providing this input information.

Illustrative embodiments also crawl the Internet and/or other networks to retrieve other information, such as unstructured and structured data, which correspond to the input information. For example, illustrative embodiments may perform a web search for data corresponding to the currently planned event to determine whether one or more events are already scheduled during the range of dates at a location near the proposed location of the currently planned event and determine whether these already scheduled events are similar in nature to the currently planned event, which will attract the same target audience. Further, illustrative embodiments may search for data regarding nearby businesses, facilities, and attractions, which the target audience also may visit before or after the currently planned event. Furthermore, illustrative embodiments may search for city construction plans, which may adversely affect traffic and attendance at the currently planned event.

Moreover, illustrative embodiments may generate a pool of target attendees using retrieved social media data. The social media data may include, for example: information regarding people having similar personal attributes to the target audience attributes; information regarding people who have explicitly expressed an interest in the currently planned event; information that would indicate that certain people are unable to physically attend the currently planned event based on geography (e.g., live beyond a defined threshold distance from the proposed location of the currently planned event); information regarding people who have attended same or similar events in the past, but excluding people that are unable to physically attend the currently planned event based on geography; and the like.

Once illustrative embodiments determine the pool of target social media users that may attend the currently planned event, illustrative embodiments determine the most available dates for these users by analyzing events that these users have already indicated that they are going to attend on specified dates. Illustrative embodiments will not select dates when a majority of the target audience is already scheduled for other events. Also, as a by-product of analyzing social media sentiment, illustrative embodiments may recommend an adjustment to an advertising campaign corresponding to the currently planned event based on which attribute or attributes the user indicated are more important (i.e., weighted more heavily) and recommend the advertising adjustment accordingly. The output of the entire data analysis is a list of optimal dates for the currently planned event. In addition, illustrative embodiments may rank the list of optimal dates based on how much each date in the list matches the given input criteria.

As a use case example scenario, a rock and roll band wants to schedule a concert in New York City (NYC) and make the most money possible. Using illustrative embodiments, the rock and roll band inputs the following information: range of dates for event; event location; cost of attending event; a set of keywords (e.g., "band name", "rock and roll", "concert", and "music"); and attributes corresponding to the target audience (e.g., "concert-goers", "rock and roll listeners", "live in or near NYC", and the like). Illustrative embodiments perform a web search and discover that there are already several scheduled rock and roll concerts in the month of August in or near NYC. As a result, illustrative embodiments rule out the month of August for the currently planned event. Also during the web search, illustrative embodiments find that NYC has a big road construction project planned for the first four days of September. Consequently, illustrative embodiments also will avoid selecting those days for the currently planned event.

Illustrative embodiments crawl social media website data to find a pool of target attendees who live in or near NYC and are fans of rock and roll, have expressed interest in the currently planned event, or have attended same or similar rock and roll events in the past. Out of this pool of target attendees, illustrative embodiments determine the dates that are most available for the majority of the target attendees based on their social media calendars listing already scheduled events. After analyzing all of the data, illustrative embodiments select Friday, September 17th as the optimal or best date, which will provide the most availability of the target audience and will result in the best attendance. Illustrative embodiments also may recommend a second-best date of Saturday, September 18th as this date has similar, but slightly less, availability for the target audience.

Moreover, if the user feeds the actual event attendance records into a data processing system utilizing illustrative embodiments, then illustrative embodiments utilize a cognitive learning algorithm to improve date selects for future events. For example, assume the attributes used in the cognitive learning algorithm have different weights applied for each different attribute (i.e., making one attribute more important than another). If the cognitive learning algorithm has attendance records to compare after events have been held on dates selected by illustrative embodiments, the cognitive learning algorithm can evaluate how successful the date selections were for the held events. If cognitive learning algorithm determines that the date selections were not successful based on a defined threshold level of success, the cognitive learning algorithm may apply different weights to the attributes the next time the user runs illustrative embodiments for optimal event date selection.

Machine learning is a type of artificial intelligence that allows software applications to become more accurate in predicting outcomes without being explicitly programmed. The basic premise of machine learning is to build algorithms that can receive input data and use statistical analysis to predict an output value within an acceptable range. Cognitive computing includes machine learning, natural language processing, and human-computer interaction.

With reference now to FIG. 3, a diagram illustrating an example of an event planning management system is depicted in accordance with an illustrative embodiment. Event planning management system 300 may be implemented in a network of data processing systems, such as network data processing system 100 in FIG. 1. Event planning management system 300 is a system of hardware and software components for selecting the best or optimal date for a planned event using cognitive learning to obtain a highest level of attendance for the planned event while decreasing the amount of expense and time spent on coordinating the planned event.

In this example, event planning management system 300 includes data processing system 302. Data processing system 302 may be, for example, data processing system 200 in FIG. 2. However, it should be noted that event planning management system 300 may include any number of servers, clients, and other data processing systems not shown.

Data processing system 302 includes event manager 304, such as event manager 218 in FIG. 2. Data processing system 302 utilizes event manager 304 to intake and process event input data 306, such as event input data 220 in FIG. 2. In this example, event input data 306 includes event location 308, target data range 310, event attributes 312, and target audience attributes 314, which correspond to the planned event.

In addition, data processing system 302 utilizes event manager 304 to retrieve web search data 316 from one or more networks and social media data 318 from one or more social media websites. Web search data 316 and social media data 318 may be, for example, web search data 228 and social media data 230 in FIG. 2. In addition, web search data 316 and social media data 318 correspond to event input data 306.

Event manager 304 generates event output data 320, such as event output data 232 in FIG. 2, based on analysis of event input data 306, web search data 316, and social media data 318. Event output data 320 results in list of ranked event dates 322. Event manager 304 ranks the dates from highest to lowest in list of ranked event dates 322 by which dates will result in a highest level of attendance by a target audience for the planned event.

Figure 4:
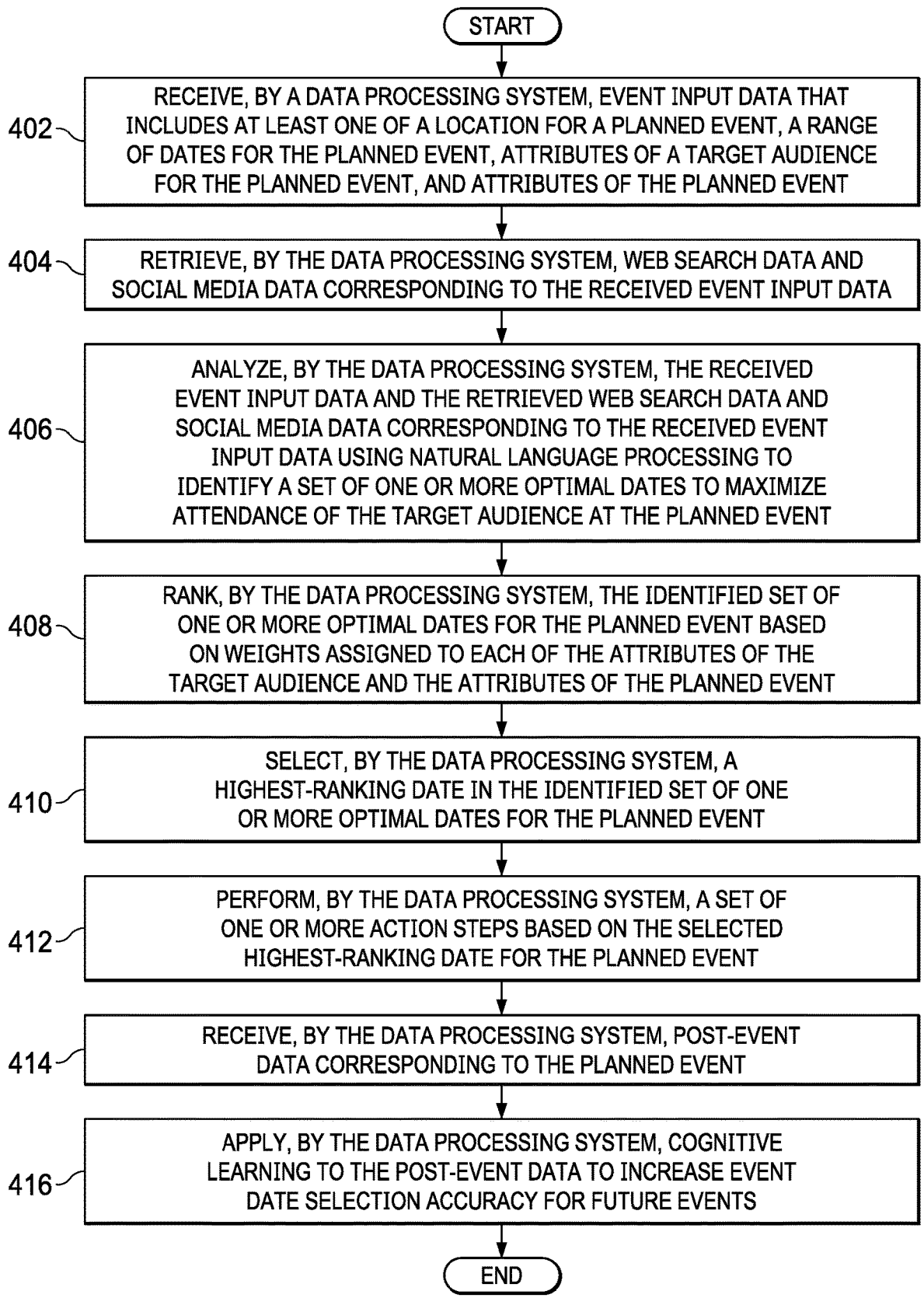
FIG. 4 is a flowchart illustrating a process for selecting an optimal date for a planned event in accordance with an illustrative embodiment.

With reference now to FIG. 4, a flowchart illustrating a process for selecting an optimal date for a planned event is shown in accordance with an illustrative embodiment. The process shown in FIG. 4 may be implemented in a data processing device, such as, for example, server 104 or client 110 in FIG. 1 or data processing system 200 in FIG. 2.

The process begins when the data processing system receives event input data that includes at least one of a location for a planned event, a range of dates for the planned event, attributes of a target audience for the planned event, and attributes of the planned event (step 402). In addition, the data processing system retrieves web search data and social media data corresponding to the received event input data (step 404). Afterward, the data processing system analyzes the received event input data and the retrieved web search data and social media data corresponding to the received event input data using natural language processing to identify a set of one or more optimal dates to maximize attendance of the target audience at the planned event (step 406).

Further, the data processing system ranks the identified set of one or more optimal dates for the planned event based on weights assigned to each of the attributes of the target audience and the attributes of the planned event (step 408). Furthermore, the data processing system selects a highest-ranking date in the identified set of one or more optimal dates for the planned event (step 410). Moreover, the data processing system performs a set of one or more action steps based on the selected highest-ranking date for the planned event (step 412).

Subsequently, the data processing system receives post-event data corresponding to the planned event (step 414). The data processing system applies cognitive learning to the post-event data to increase event date selection accuracy for future events (step 416). Thereafter, the process terminates.

Thus, illustrative embodiments of the present invention provide a computer-implemented method, computer system, and computer program product for selecting the best or optimal date for a planned event using cognitive learning to obtain a highest level of attendance for the planned event while decreasing the amount of expense and time spent on coordinating the planned event. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting an optimal date for a planned event using machine-based natural language processing, the computer-implemented method comprising:
   receiving, by a data processing system, event input data that includes at least one of a location for a planned event, a range of dates for the planned event, attributes of a target audience for the planned event, and attributes of the planned event;
   retrieving, by the data processing system, web search data from at least one network and social media data corresponding to the received event input data from at least one website;
   analyzing, by the data processing system, the received event input data and the retrieved web search data and social media data that correspond to the received event input data using the machine-based natural language processing to identify a set of optimal dates to maximize attendance of the target audience at the planned event;
   ranking, by the data processing system, the identified set of optimal dates for the planned event based on weights assigned to each of the attributes of the target audience and the attributes of the planned event;
   selecting, by the data processing system, a highest-ranking date in the identified set of optimal dates for the planned event; and
   performing, by the data processing system, a set of action steps pertaining to the planned event based on the selected highest-ranking date for the planned event.

2. The computer-implemented method of claim 1 further comprising:
   assigning, by the data processing system, different weights to each of the attributes of the target audience and the attributes of the planned event responsive to determining that the highest-ranking date for the planned event is not successful based on a defined threshold level of success.

3. The computer-implemented method of claim 1, wherein the set of action steps includes scheduling the planned event on the selected highest-ranking date, reserving a site for the planned event, and sending event invitations to the target audience.

4. The computer-implemented method of claim 1 further comprising:
   receiving, by the data processing system, post-event data corresponding to the planned event; and
   applying, by the data processing system, cognitive machine learning to the post-event data to increase event date selection accuracy for future events.

5. The computer-implemented method of claim 1, wherein the attributes of the target audience include age range of potential attendees, income of potential attendees, geographic location of potential attendees, and personal interests and preferences of potential attendees that match keywords describing a focus of the planned event.

6. The computer-implemented method of claim 1, wherein the attributes of the planned event include type of event, cost of attendance, and one or more keywords describing a focus of the planned event.

7. The computer-implemented method of claim 1, wherein the web search data include information regarding same or similar events already scheduled in or near a location for the planned event on or near the identified set of optimal dates for the planned event, information regarding businesses, entertainment, and places of interest near the planned event, information regarding construction projects near the planned event, and information regarding city events already scheduled on the identified set of optimal dates for the planned event.

8. The computer-implemented method of claim 1, wherein the social media data include information regarding social media users that have personal interests or preferences that match information in the attributes of the target audience, information regarding social media users that have previously attended events that are same or similar to the planned event, information regarding social media users that are available during the identified set of optimal dates for the planned event.

9. A data processing system for selecting an optimal date for a planned event using machine-based natural language processing, the data processing system comprising:
   a bus system;
   a storage device connected to the bus system, wherein the storage device stores program instructions; and
   a processor connected to the bus system, wherein the processor executes the program instructions to:
      receive event input data that includes at least one of a location for a planned event, a range of dates for the planned event, attributes of a target audience for the planned event, and attributes of the planned event;
      retrieve web search data from at least one network and social media data corresponding to the received event input data from at least one web site;
      analyze the received event input data and the retrieved web search data and social media data that correspond to the received event input data using the machine-based natural language processing to identify a set of optimal dates to maximize attendance of the target audience at the planned event;
      rank the identified set of optimal dates for the planned event based on weights assigned to each of the attributes of the target audience and the attributes of the planned event;
      select a highest-ranking date in the identified set of optimal dates for the planned event; and
      perform a set of action steps pertaining to the planned event based on the selected highest-ranking date for the planned event.

10. The data processing system of claim 9, wherein the processor further executes the program instructions to:

assign different weights to each of the attributes of the target audience and the attributes of the planned event responsive to determining that the highest-ranking date for the planned event is not successful based on a defined threshold level of success.

11. The data processing system of claim 9, wherein the set of action steps includes scheduling the planned event on the selected highest-ranking date, reserving a site for the planned event, and sending event invitations to the target audience.

12. The data processing system of claim 9, wherein the processor further executes the program instructions to:
    receive post-event data corresponding to the planned event; and
    apply cognitive machine learning to the post-event data to increase event date selection accuracy for future events.

13. A computer program product for selecting an optimal date for a planned event using machine-based natural language processing, the computer program product comprising a computer readable storage medium having program instructions embodied therewith, the program instructions executable by a data processing system to cause the data processing system to perform a method comprising:
    receiving, by the data processing system, event input data that includes at least one of a location for a planned event, a range of dates for the planned event, attributes of a target audience for the planned event, and attributes of the planned event;
    retrieving, by the data processing system, web search data from at least one network and social media data corresponding to the received event input data from at least one website;
    analyzing, by the data processing system, the received event input data and the retrieved web search data and social media data that correspond to the received event input data using the machine-based natural language processing to identify a set of optimal dates to maximize attendance of the target audience at the planned event;
    ranking, by the data processing system, the identified set of optimal dates for the planned event based on weights assigned to each of the attributes of the target audience and the attributes of the planned event;
    selecting, by the data processing system, a highest-ranking date in the identified set of optimal dates for the planned event; and
    performing, by the data processing system, a set of action steps pertaining to the planned event based on the selected highest-ranking date for the planned event.

14. The computer program product of claim 13 further comprising:
    assigning, by the data processing system, different weights to each of the attributes of the target audience and the attributes of the planned event responsive to determining that the highest-ranking date for the planned event is not successful based on a defined threshold level of success.

15. The computer program product of claim 13, wherein the set of action steps includes scheduling the planned event on the selected highest-ranking date, reserving a site for the planned event, and sending event invitations to the target audience.

16. The computer program product of claim 13 further comprising:
    receiving, by the data processing system, post-event data corresponding to the planned event; and
    applying, by the data processing system, cognitive machine learning to the post-event data to increase event date selection accuracy for future events.

17. The computer program product of claim 13, wherein the attributes of the target audience include age range of potential attendees, income of potential attendees, geographic location of potential attendees, and personal interests and preferences of potential attendees that match keywords describing a focus of the planned event.

18. The computer program product of claim 13, wherein the attributes of the planned event include type of event, cost of attendance, and one or more keywords describing a focus of the planned event.

19. The computer program product of claim 13, wherein the web search data include information regarding same or similar events already scheduled in or near a location for the planned event on or near the identified set of optimal dates for the planned event, information regarding businesses, entertainment, and places of interest near the planned event, information regarding construction projects near the planned event, and information regarding city events already scheduled on the identified set of optimal dates for the planned event.

20. The computer program product of claim 13, wherein the social media data include information regarding social media users that have personal interests or preferences that match information in the attributes of the target audience, information regarding social media users that have previously attended events that are same or similar to the planned event, information regarding social media users that are available during the identified set of optimal dates for the planned event.

* * * * *